(12) United States Patent
Shelby et al.

(10) Patent No.: US 12,281,721 B2
(45) Date of Patent: Apr. 22, 2025

(54) METERING VALVE WITH STEPPER MOTOR-CONTROLLED ROTARY FOLLOW-UP SERVO

(71) Applicant: HONEYWELL INTERNATIONAL INC., Charlotte, NC (US)

(72) Inventors: J. Dugan Shelby, South Bend, IN (US); Bradley McRoberts, South Bend, IN (US); Martin Dutka, South Bend, IN (US); Austin Hasse, South Bend, IN (US); Sammuel Tillich, South Bend, IN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1011 days.

(21) Appl. No.: 17/322,114

(22) Filed: May 17, 2021

(65) Prior Publication Data

US 2022/0364658 A1 Nov. 17, 2022

(51) Int. Cl.
*F02C 9/26* (2006.01)
*F02C 7/232* (2006.01)
*F02C 9/32* (2006.01)
*F16K 31/40* (2006.01)

(52) U.S. Cl.
CPC ............ *F16K 31/406* (2013.01); *F02C 7/232* (2013.01); *F02C 9/263* (2013.01); *F02C 9/32* (2013.01)

(58) Field of Classification Search
CPC .......... F16K 31/406; F02C 9/32; F02C 9/263; F02C 7/232; F05D 2270/62; G05D 7/0635–0664; G05D 16/2086

USPC .............................................. 251/30.04–30.5
See application file for complete search history.

(56) References Cited

U.S. PATENT DOCUMENTS

| | | | |
|---|---|---|---|
| 4,145,956 A * | 3/1979 | Rumrill, Jr. ............ | F15B 13/043 91/461 |
| 4,612,616 A | 9/1986 | Binns et al. | |
| 4,779,648 A * | 10/1988 | Sloate ................. | F15B 13/0402 137/625.6 |
| 5,000,220 A * | 3/1991 | Eick ....................... | G05D 7/005 251/38 |
| 5,385,328 A * | 1/1995 | Hofmann ............ | F16K 31/1221 251/38 |
| 7,337,806 B2 | 3/2008 | Spickard et al. | |

(Continued)

FOREIGN PATENT DOCUMENTS

| | | | | |
|---|---|---|---|---|
| CN | 108757183 A | * | 11/2018 | ............. F02C 7/232 |
| GB | 2414767 A | | 12/2005 | |

*Primary Examiner* — Marina A Tietjen
(74) *Attorney, Agent, or Firm* — Lorenz & Kopf LLP

(57) ABSTRACT

A metering valve includes a valve body, a valve element, a rotary servo, and a stepper motor. The valve body has a valve chamber, a fluid inlet port, a fluid outlet port, a metering valve control pressure inlet port, a servo control pressure inlet port, and a servo control pressure outlet port. The valve element is movably disposed within the valve chamber and defines therein at least a control pressure chamber and a return pressure chamber. The valve element is responsive to fluid pressure in the control pressure chamber to move between a closed position and a plurality of open positions. The rotary servo is rotatable about a rotational axis to a plurality of servo positions to thereby vary fluid pressure in the control pressure chamber. The stepper motor is responsive to commands to rotate the rotary servo to a commanded servo position.

20 Claims, 3 Drawing Sheets

(56) References Cited

U.S. PATENT DOCUMENTS

| | | |
|---|---|---|
| 7,878,003 B1 | 2/2011 | Smith |
| 7,926,512 B2 | 4/2011 | Spickard et al. |
| 2006/0130914 A1* | 6/2006 | Barber ................ F15B 13/0435 137/625.64 |
| 2020/0011444 A1* | 1/2020 | Morita ................ G05D 7/0635 |

* cited by examiner

METERING VALVE WITH STEPPER MOTOR-CONTROLLED ROTARY FOLLOW-UP SERVO

TECHNICAL FIELD

The present invention generally relates to metering valves, and more particularly relates to a metering valve with a stepper motor-controlled rotary follow-up servo.

BACKGROUND

Many fluid flow control systems use metering valves to control the flow of a fluid from a source to a destination. For example, metering valves may be used to control the flow of fuel to a gas turbine engine. In many instances, it is preferable that the metering valve be configured to "fail-fixed." That is, to remain in its last commanded position in the unlikely event of a loss of electrical power. To this end, many systems used stepper motors to position the metering valve since, as is generally known, stepper motors will maintain the last commanded position when deenergized.

Although generally safe, reliable, and robust, presently known stepper motor-controlled metering valve systems suffer certain drawbacks. For example, these presently known systems exhibit limited force margin, and typically rely on relatively complex gearing and/or mechanical coupling between the stepper motor and metering valve.

Hence, there is a need for a stepper motor-controlled metering valve system that exhibits increased force margin as compared to known systems, and that does not rely on relatively complex gearing and/or mechanical coupling between the stepper motor and metering valve. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a metering valve includes a valve body, a valve element, a rotary servo, and a stepper motor. The valve body has an inner surface that defines a valve chamber. The valve body further includes at least a fluid inlet port, a fluid outlet port, a metering valve control pressure inlet port, a servo control pressure inlet port, and a servo control pressure outlet port. The metering valve control pressure inlet port is in fluid communication with the servo control pressure inlet port. The valve element is movably disposed within the valve chamber and defines therein at least a control pressure chamber and a return pressure chamber. The valve element is responsive to fluid pressure in the control pressure chamber to move between a closed position, in which the fluid inlet port is fluidly isolated from the fluid outlet port to prevent fluid flow from the fluid inlet port to the fluid outlet port, and a plurality of open positions, in which the fluid inlet port is in fluid communication with the fluid outlet port to allow fluid flow from the fluid inlet port to the fluid outlet port. The rotary servo is rotationally disposed within the return pressure chamber. The rotary servo is rotatable about a rotational axis to a plurality of servo positions to thereby vary fluid pressure in the control pressure chamber, whereby the valve element is moved between the closed position and the plurality of open positions. The stepper motor is coupled to the rotary servo. The stepper motor is responsive to commands to rotate the rotary servo to a commanded servo position, whereby the valve element is moved to a commanded valve element position.

In another embodiment, a fuel control system includes a controller and a fuel metering valve. The controller is operable to supply metering valve position commands. The fuel metering valve is coupled to receive the metering valve position commands from the controller and is configured, in response thereto, to move to a commanded valve position. The fuel metering valve includes a valve body, a valve element, a rotary servo, and a stepper motor. The valve body has an inner surface that defines a valve chamber. The valve body further includes at least a fluid inlet port, a fluid outlet port, a metering valve control pressure inlet port, a servo control pressure inlet port, and a servo control pressure outlet port. The metering valve control pressure inlet port is in fluid communication with the servo control pressure inlet port. The valve element is movably disposed within the valve chamber and defines therein at least a control pressure chamber and a return pressure chamber. The valve element is responsive to fluid pressure in the control pressure chamber to move between a closed position, in which the fluid inlet port is fluidly isolated from the fluid outlet port to prevent fluid flow from the fluid inlet port to the fluid outlet port, and a plurality of open positions, in which the fluid inlet port is in fluid communication with the fluid outlet port to allow fluid flow from the fluid inlet port to the fluid outlet port. The rotary servo is rotationally disposed within the return pressure chamber. The rotary servo is rotatable about a rotational axis to a plurality of servo positions to thereby vary fluid pressure in the control pressure chamber, whereby the valve element is moved between the closed position and the plurality of open positions. The stepper motor is coupled to the rotary servo. The stepper motor is responsive to commands to rotate the rotary servo to a commanded servo position, whereby the valve element is moved to the commanded valve element position.

In yet another embodiment, a gas turbine engine system includes a gas turbine engine, an engine controller, and a fuel metering valve. The gas turbine engine is adapted to receive a flow of fuel from a fuel source. The engine controller is operable to supply metering valve position commands. The fuel metering valve is in fluid communication with the gas turbine engine and is operable to control the flow of fuel from the fuel source to the gas turbine engine. The fuel metering valve is coupled to receive the metering valve position commands from the controller and configured, in response thereto, to move to a commanded valve position. The fuel metering valve includes a valve body, a valve element, a rotary servo, and a stepper motor. The valve body has an inner surface that defines a valve chamber. The valve body further includes at least a fluid inlet port, a fluid outlet port, a metering valve control pressure inlet port, a servo control pressure inlet port, and a servo control pressure outlet port. The metering valve control pressure inlet port is in fluid communication with the servo control pressure inlet port. The valve element is movably disposed within the valve chamber and defines therein at least a control pressure chamber and a return pressure chamber. The valve element is responsive to fluid pressure in the control pressure chamber to move between a closed position, in which the fluid inlet port is fluidly isolated from the fluid outlet port to prevent fluid flow from the fluid inlet port to the fluid outlet port, and a plurality of open positions, in which the fluid inlet port is in fluid communication with the fluid outlet port to allow fluid flow from the fluid inlet port to the fluid outlet port. The rotary servo is rotationally disposed within the return pressure chamber. The rotary servo is rotatable about a rotational axis to a plurality of servo positions to thereby vary fluid pressure in the control pressure chamber, whereby the valve element is moved between the closed position and the plurality of open positions. The stepper motor is coupled to the rotary servo. The stepper motor is responsive to commands to rotate the rotary servo to a commanded servo position, whereby the valve element is moved to the commanded valve element position.

Furthermore, other desirable features and characteristics of the metering valve, fuel control system, and gas turbine engine system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
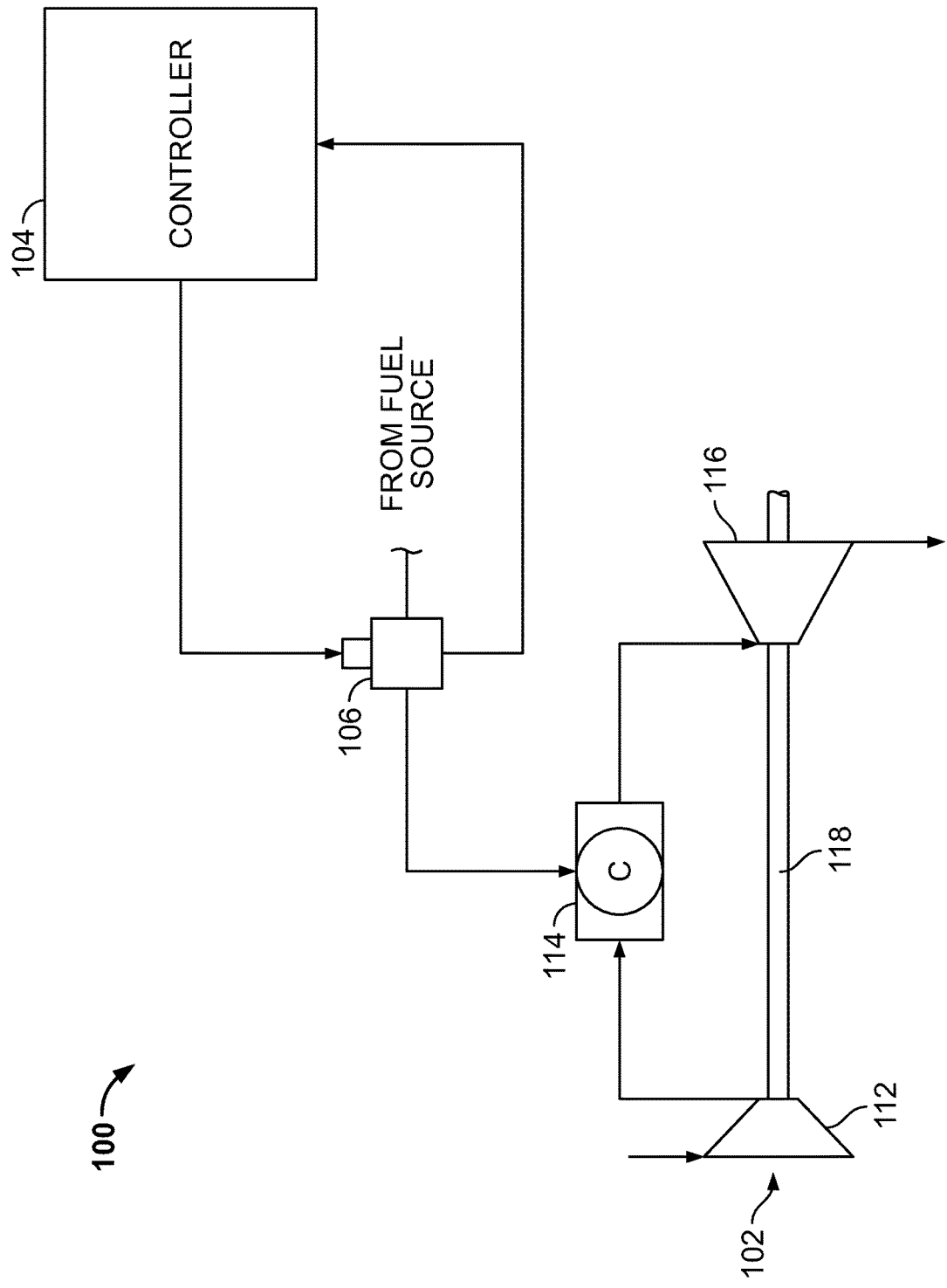
FIG. 1 depicts a schematic diagram of one embodiment of a gas turbine engine system.

Referring now to FIG. 1, one embodiment of a gas turbine engine system 100 is depicted and includes a gas turbine engine 102, a controller 104, and a metering valve 106. The gas turbine engine 102, at least in the depicted embodiment, is implemented as an aircraft auxiliary power unit (APU) and includes at least a compressor 112, a combustor 114, and a turbine 116. Before proceeding further, it will be appreciated that the gas turbine engine system 100 may be implemented with various types of gas turbine engines 102, not just those configured as APUs, and in various environments, not just aircraft. For example, the gas turbine engine 102 may be implemented using a turbofan gas turbine engine (single or multi-spool) or any one of numerous other gas turbine engine configurations and in any one of numerous other end-use environments.

Returning now to the description, as is generally known, during operation of the gas turbine engine 102, the compressor 112 draws in ambient air, compresses it, and directs the compressed air into the combustor 114. In the depicted embodiment, only a single compressor 112 is shown, though it will be appreciated that one or more additional compressors could be used.

In the combustor 114, the compressed air supplied from the compressor 112 is mixed with fuel that is controllably supplied from a non-illustrated fuel source via, for example, the metering valve 106. The fuel/air mixture is combusted, via non-illustrated igniters, to generate high energy combusted gas that is then directed into the turbine 116. The turbine 116 may include one or more turbines. In the depicted embodiment, only a single turbine is included. No matter the particular number, the combusted gas from the combustor 114 expands through the turbine 116, causing it to rotate. As the turbine 116 rotates, it drives the compressor 112 via a spool 118.

The controller 104 controls the operation of the gas turbine engine 102 and may thus, at least in the depicted embodiment, be referred to as an engine controller. More specifically, the controller 104 receives signals from various non-illustrated sensors and systems and, in response to these signals, controls the overall operation of the gas turbine engine 102. As part of this control, the controller 104 is operable to supply metering valve position commands to the metering valve 106. The controller 104 may be variously configured and implemented. For example, in the depicted embodiment it is configured as an engine controller, which may be implemented as an electronic engine control unit (ECU) or as a full-authority digital engine controller (FADEC), just to name a few.

The metering valve 106 is in fluid communication with the gas turbine engine 102 and is operable to control the flow of fuel from the non-illustrated fuel source to the gas turbine engine 102. In this regard, the metering valve 106 may also, in some instances, be referred to as a fuel metering valve (FMV). Regardless of the nomenclature, it is seen that the metering valve 106 is coupled to receive the metering valve position commands from the controller 104. The metering valve 106 is configured, in response to the metering valve position commands, to move to a commanded valve position, to thereby control the flow of fuel to the gas turbine engine 102.

Figure 2:
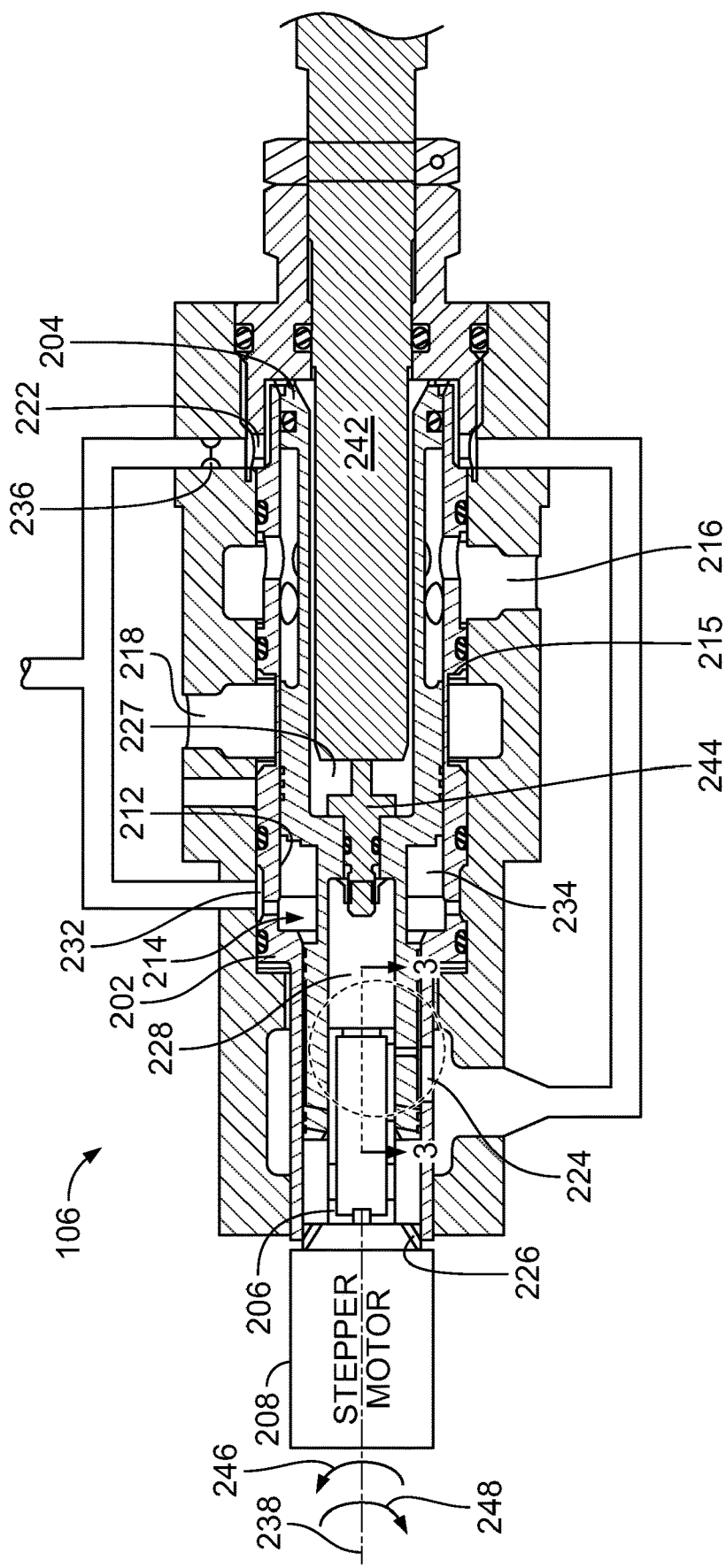
FIG. 2 depicts a cross section view of one embodiment of a metering valve that may be used in the system of FIG. 1.

The metering valve 106 is also configured to "fail-fixed." That is, in the unlikely event power to the metering valve 106 is lost, it is configured to remain in its last commanded position. In addition, the metering valve 106 exhibits enhanced force margin as compared to known metering valve configurations. A cross sectional view of one embodiment of the metering valve 106 is depicted in FIG. 2, and with reference thereto will now be described.

The metering valve 104 includes a valve body 202, a valve element 204, a rotary servo 206, and a stepper motor 208. The valve body 202 includes an inner surface 212, which defines a valve chamber 214, a valve seat 215, a fluid inlet port 216, a fluid outlet port 218, a metering valve control pressure inlet port 222, a servo control pressure inlet port 224, and at least one a servo control pressure outlet port 226. As readily seen, the metering valve control pressure inlet port 222 is in fluid communication with the servo control pressure inlet port 224 via suitable pluming.

The valve element 204 is movably disposed within the valve chamber 214. The valve element 204 defines, within the valve chamber 214, at least a control pressure chamber 227 and a return pressure chamber 228. The valve element 204 is responsive to fluid pressure in the control pressure chamber to move between a closed position and a plurality of open positions. In the closed position, which is the position depicted in FIG. 1, the valve element 204 engages the valve seat 215. Thus, the fluid inlet port 216 is fluidly isolated from the fluid outlet port 218 to prevent fluid (e.g., fuel) flow from the fluid inlet port 216 to the fluid outlet port 218. In any of the plurality of open positions, which are not depicted, the valve element 204 does not engage the valve seat 215. Thus, the fluid inlet port 216 is in fluid communication with the fluid outlet port 218 to allow fluid flow from the fluid inlet port 216 to the fluid outlet port 218.

The depicted valve body 202 additionally includes a pressure regulator port 232, and the valve element 204 additionally defines a pressure regulated chamber 234. The pressure regulator port 232 is in fluid communication with the pressure regulated chamber 234 and with the metering valve control pressure inlet port 222 (via suitable plumbing). The fuel metering valve 204 further comprises a flow-limiting orifice 236, which is disposed within, or upstream of, the metering valve control pressure inlet port 222.

The rotary servo 206 is rotationally disposed within the return pressure chamber 228. The rotary servo 206 is rotatable about a rotational axis 238 to a plurality of servo positions, to thereby vary fluid pressure in the control pressure chamber 227. The fluid pressure variation in the control pressure chamber 227 results in movement of the valve element 204. To implement this functionality, and as shown more clearly in FIG. 3, the rotary servo 206 includes a main body 302 that has an inner surface 304, an outer surface 306, and a rotary servo metering port 308 that extends between the inner surface 304 and the outer surface 306. The inner surface 304 defines a rotary servo chamber 312 that is in fluid communication with both the return pressure chamber 228 and the servo control pressure outlet port 226 (not shown in FIG. 3). As FIG. 3 additionally depicts, a portion of the valve element 204 surrounds a portion of the rotary servo 206. This portion of the valve element 204 has a valve element metering port 314 formed therein, which fluidly communicates the servo control pressure inlet port 224 to the rotary servo chamber 312.

Figure 3:
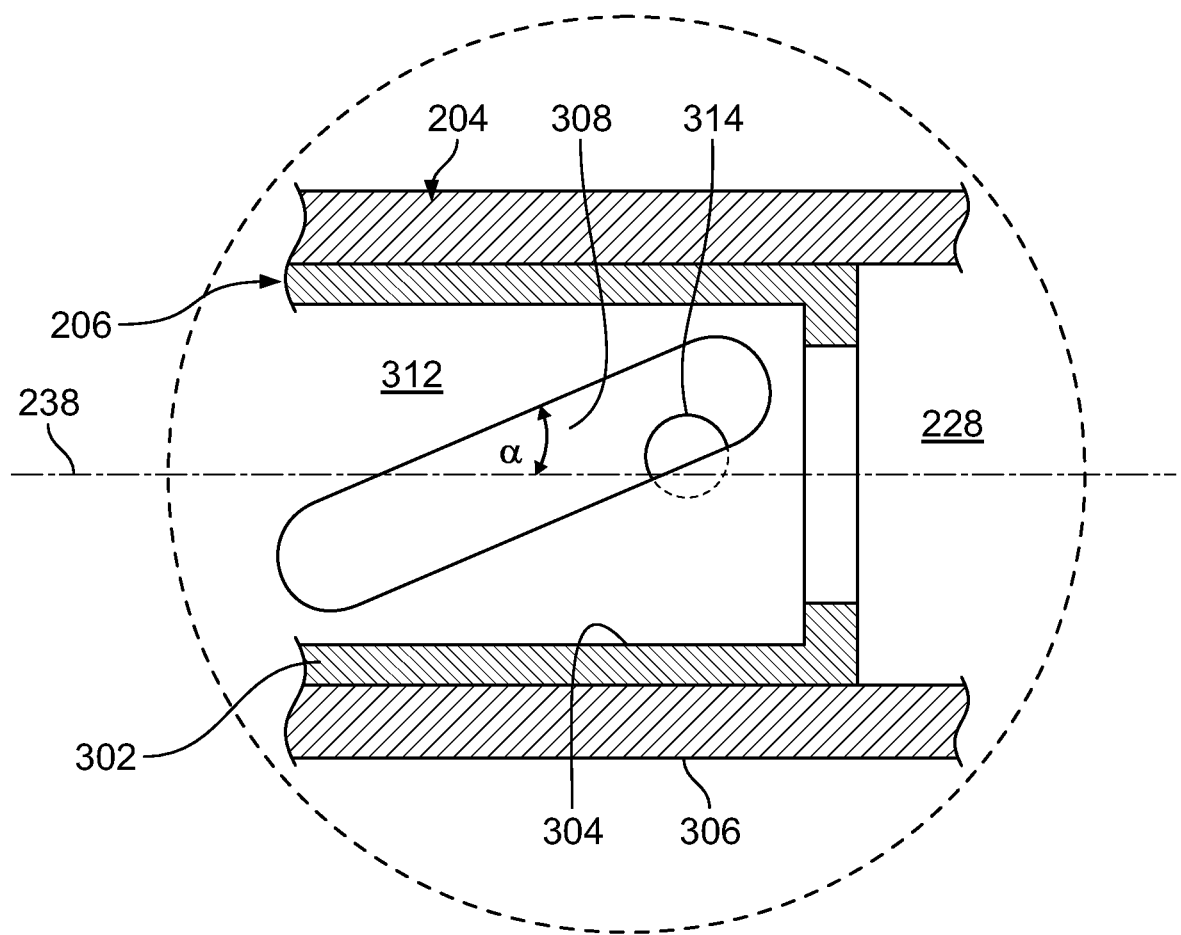
FIG. 3 depicts a cutaway view of a portion of the metering valve of FIG. 2, taken along line 3-3 in FIG. 2.

With continued reference to FIG. 3, it is seen that the rotary servo metering port 308 is disposed at an angle ($\alpha$) relative to the rotational axis 238. As a result, rotation of the rotary servo 206 and movement of the valve element 204 varies the flow area between the servo control pressure inlet port 224 and the rotary servo chamber 312. This in turn modulates the fluid pressure in the control pressure chamber 227. It will be appreciated that the angle ($\alpha$) at which the rotary servo metering port 308 is disposed may vary, and it is selected to achieve a desired area change with translation of the valve element metering port 314. In one particular embodiment, the rotary servo metering port 308 is disposed at 37-degrees. However, the angle may be, for example, in the range of 30-degrees to 60-degrees.

Regardless of the particular angle at which the rotary servo metering port 308 is disposed, the rotary servo 206 is rotated by the stepper motor 208. More specifically, the stepper motor 208 is coupled to the rotary servo 206 and to the controller 104, and is responsive to the valve position commands supplied from the controller 104 to rotate the rotary servo 206 to a commanded servo position, whereby the valve element 204 is moved to the commanded valve position. It will be appreciated that the stepper motor 208 may be implemented using any one of numerous know stepper motor configurations. For example, it may be implemented using a variable reluctance stepper motor, a permanent magnet stepper motor, or a hybrid thereof. No matter the specific type of stepper motor used, it is generally known that a stepper motor 208 exhibits a detent (or cogging) torque when it is not energized. Thus, it will remain in its last commanded position when it is not energized due to, for example, a loss of electrical power. As a result, the valve element 204 will also remain in its last commanded position in the unlikely event of a loss of electrical power.

Before proceeding further, it is noted that the depicted metering valve 106 additionally includes a position sensor 242. Although the position sensor may be variously configured and implemented, in the depicted embodiment it is implemented using a linear variable differential transformer (LVDT) sensor. In the depicted embodiment, the moveable core 244 of the LVDT is coupled to the valve element 204. Again, as just noted, any one of numerous other types of position sensors may also be used.

Having described each of the components that comprise the metering valve 106, and having also described the functions of each of these components, the overall function of the metering valve 106 will now be described. In doing so, reference should be made to both FIGS. 2 and 3. Moreover, it is assumed that the valve element 204 is in an open position, and that the stepper motor 208 is commanded to rotate the rotary servo 206 in a first rotational direction 246.

With the above in mind, when the rotary servo 206 is rotated in the first direction 246, the rotary servo metering port 308 moves downwardly (as viewed from the perspective in FIG. 3). This increases the flow area between the servo control pressure inlet port 224 and the rotary servo chamber 312 (via the metering valve metering port 314), which in turn decreases the fluid pressure in the control pressure chamber 227, causing the valve element 204 to move to the right (as viewed from the perspective in FIG. 3) toward a more closed position. This movement of the valve element 204 concomitantly moves the valve element metering port 314 to the right. This decreases the flow area between the servo control pressure inlet port 224 and the rotary servo chamber 312, which in turn increases the fluid pressure in the control pressure chamber 227, causing the valve element 204 to stop moving.

As may be appreciated, when the stepper motor 208 is commanded to rotate the rotary servo 206 in a second direction 248 (opposite the first direction 246), the rotary servo metering port 308 moves upwardly (as viewed from the perspective in FIG. 3). This decreases the flow area between the servo control pressure inlet port 224 and the rotary servo chamber 312, which in turn increases the fluid pressure in the control pressure chamber 227, causing the valve element 204 to move to the left (as viewed from the perspective in FIG. 3) toward a more open position. This movement of the valve element 204 concomitantly moves the valve element metering port 314 to the left. This increases the flow area between the servo control pressure inlet port 224 and the rotary servo chamber 312, which in turn decreases the fluid pressure in the control pressure chamber 227, causing the valve element 204 to stop moving.

The metering valve 106 described herein exhibits relatively higher force margin with minimal mechanical complexity as compared to known stepper motor-controlled metering valves. This, at least in part, is because the stepper motor 208 is isolated from the valve/system inertia, which also makes it a relatively lower-cost device. The metering valve 106 can exhibit 10-100X the chip-shear force exhibited by known stepper motor-controlled metering valves. Overall part count, and thus overall cost, is minimized by translating the rotary action of the stepper motor into pressure modulation on the end of the metering valve via the rotary servo.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A metering valve, comprising:
    a valve body having an inner surface that defines a valve chamber, the valve body further including at least a fluid inlet port, a fluid outlet port, a metering valve control pressure inlet port, a servo control pressure inlet port, and a servo control pressure outlet port, the metering valve control pressure inlet port in fluid communication with the servo control pressure inlet port;
    a valve element movably disposed within the valve chamber and defining therein at least a control pressure chamber and a return pressure chamber, the valve element responsive to fluid pressure in the control pressure chamber to move between a closed position, in which the fluid inlet port is fluidly isolated from the fluid outlet port to prevent fluid flow from the fluid inlet port to the fluid outlet port, and a plurality of open positions, in which the fluid inlet port is in fluid communication with the fluid outlet port to allow fluid flow from the fluid inlet port to the fluid outlet port;
    a rotary servo rotationally disposed within the return pressure chamber, the rotary servo rotatable about a rotational axis to a plurality of servo positions to thereby vary fluid pressure in the control pressure chamber, whereby the valve element is moved between the closed position and the plurality of open positions; and
    a stepper motor coupled to the rotary servo, the stepper motor responsive to commands to rotate the rotary servo to a commanded servo position, whereby the valve element is moved to a commanded valve element position.

2. The metering valve of claim 1, wherein the rotary servo comprises:
    a main body having an inner surface, an outer surface, and a rotary servo metering port that extends between the inner surface and the outer surface, the inner surface defining a rotary servo chamber that is in fluid communication with the return pressure chamber and the servo control pressure outlet port, the rotary servo metering port disposed at an angle relative to the rotational axis whereby, in response to rotation of the rotary servo and movement of the valve element, a flow area between servo control pressure inlet port and the rotary servo chamber varies and the fluid pressure in the control pressure chamber is modulated.

3. The metering valve of claim 2, wherein:
    the valve element has a valve element metering port formed therein; and
    the valve element metering port fluidly communicates the servo control pressure inlet to the rotary servo chamber.

4. The metering valve of claim 1, wherein:
    the valve element further defines a pressure regulated chamber within the valve chamber; and
    the valve body further comprises a pressure regulator port, the pressure regulator port in fluid communication with the pressure regulated chamber.

5. The metering valve of claim 1, wherein:
    the metering valve control pressure inlet port is in fluid communication with the pressure regulator port.

6. The metering valve of claim 5, further comprising:
    a flow-limiting orifice disposed within the metering valve control pressure inlet port.

7. The metering valve of claim 1, further comprising:
    a position sensor coupled to, and configured to sense the position of, the valve element.

8. The metering valve of claim 7, wherein the position sensor comprises a linear variable differential transformer.

9. A fuel control system, comprising:
    a controller operable to supply metering valve position commands; and
    a fuel metering valve coupled to receive the metering valve position commands from the controller and configured, in response thereto, to move to a commanded valve position, the fuel metering valve comprising:
        a valve body having an inner surface that defines a valve chamber, the valve body further including at least a fluid inlet port, a fluid outlet port, a metering valve control pressure inlet port, a servo control pressure inlet port, and a servo control pressure outlet port, the metering valve control pressure inlet port in fluid communication with the servo control pressure inlet port;
        a valve element movably disposed within the valve chamber and defining therein at least a control pressure chamber and a return pressure chamber, the valve element responsive to fluid pressure in the control pressure chamber to move between a closed position, in which the fluid inlet port is fluidly isolated from the fluid outlet port to prevent fluid flow from the fluid inlet port to the fluid outlet port, and a plurality of open positions, in which the fluid inlet port is in fluid communication with the fluid outlet port to allow fluid flow from the fluid inlet port to the fluid outlet port;

a rotary servo rotationally disposed within the return pressure chamber, the rotary servo rotatable about a rotational axis to a plurality of servo positions to thereby vary fluid pressure in the control pressure chamber, whereby the valve element is moved between the closed position and the plurality of open positions; and a stepper motor coupled to the rotary servo, the stepper motor responsive to the valve position commands to rotate the rotary servo to a commanded servo position, whereby the valve element is moved to the commanded valve position.

10. The fuel control system of claim 9, wherein the rotary servo comprises:

a main body having an inner surface, an outer surface, and a rotary servo metering port that extends between the inner surface and the outer surface, the inner surface defining a rotary servo chamber that is in fluid communication with the return pressure chamber and the servo control pressure outlet port, the rotary servo metering port disposed at an angle relative to the rotational axis whereby, in response to rotation of the rotary servo and movement of the valve element, a flow area between servo control pressure inlet port and the rotary servo chamber varies and the fluid pressure in the control pressure chamber is modulated.

11. The fuel control system of claim 10, wherein:

the valve element has a valve element metering port formed therein; and the valve element metering port fluidly communicates the servo control pressure inlet to the rotary servo chamber.

12. The fuel control system of claim 9, wherein:

the valve element further defines a pressure regulated chamber within the valve chamber; and the valve body further comprises a pressure regulator port, the pressure regulator port in fluid communication with the pressure regulated chamber.

13. The fuel control system of claim 9, wherein:

the metering valve control pressure inlet port is in fluid communication with the pressure regulator port.

14. The fuel control system of claim 13, further comprising:

a flow-limiting orifice disposed within, or upstream of, the metering valve control pressure inlet port.

15. The fuel control system of claim 9, further comprising:

a position sensor coupled to, and configured to sense the position of, the valve element.

16. The fuel control system of claim 15, wherein the position sensor comprises a linear variable differential transformer.

17. A gas turbine engine system, comprising:

a gas turbine engine adapted to receive a flow of fuel from a fuel source;

an engine controller operable to supply metering valve position commands; and a fuel metering valve in fluid communication with the gas turbine engine and operable to control the flow of fuel from the fuel source to the gas turbine engine, the fuel metering valve coupled to receive the metering valve position commands from the controller and configured, in response thereto, to move to a commanded valve position, the fuel metering valve comprising:

a valve body having an inner surface that defines a valve chamber, the valve body further including at least a fluid inlet port, a fluid outlet port, a metering valve control pressure inlet port, a servo control pressure inlet port, and a servo control pressure outlet port, the metering valve control pressure inlet port in fluid communication with the servo control pressure inlet port;

a valve element movably disposed within the valve chamber and defining therein at least a control pressure chamber and a return pressure chamber, the valve element responsive to fluid pressure in the control pressure chamber to move between a closed position, in which the fluid inlet port is fluidly isolated from the fluid outlet port to prevent fluid flow from the fluid inlet port to the fluid outlet port, and a plurality of open positions, in which the fluid inlet port is in fluid communication with the fluid outlet port to allow fluid flow from the fluid inlet port to the fluid outlet port;

a rotary servo rotationally disposed within the return pressure chamber, the rotary servo rotatable about a rotational axis to a plurality of servo positions to thereby vary fluid pressure in the control pressure chamber, whereby the valve element is moved between the closed position and the plurality of open positions; and a stepper motor coupled to the rotary servo, the stepper motor responsive to the valve position commands to rotate the rotary servo to a commanded servo position, whereby the valve element is moved to the commanded valve position.

18. The gas turbine engine system of claim 17, wherein the rotary servo comprises:

a main body having an inner surface, an outer surface, and a rotary servo metering port that extends between the inner surface and the outer surface, the inner surface defining a rotary servo chamber that is in fluid communication with the return pressure chamber and the servo control pressure outlet port, the rotary servo metering port disposed at an angle relative to the rotational axis whereby, in response to rotation of the rotary servo and movement of the valve element, a flow area between servo control pressure inlet port and the rotary servo chamber varies and the fluid pressure in the control pressure chamber is modulated.

19. The gas turbine engine system of claim 18, wherein:

the valve element has a valve element metering port formed therein; and the valve element metering port fluidly communicates the servo control pressure inlet to the rotary servo chamber.

20. The gas turbine engine system of claim 17, wherein:

the valve element further defines a pressure regulated chamber within the valve chamber;

the valve body further comprises a pressure regulator port, the pressure regulator port in fluid communication with the pressure regulated chamber;

the metering valve control pressure inlet port is in fluid communication with the pressure regulator port; and the fuel metering valve further comprises a flow-limiting orifice disposed within, or upstream of, the metering valve control pressure inlet port.

* * * * *